US008483009B2

(12) United States Patent
Lee et al.

(10) Patent No.: US 8,483,009 B2
(45) Date of Patent: Jul. 9, 2013

(54) CHARACTERIZING SPATIAL VARIABILITY OF SURFACE WAVES IN SEISMIC PROCESSING

(75) Inventors: Sunwoong Lee, Houston, TX (US); Warren S. Ross, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 439 days.

(21) Appl. No.: 12/811,464

(22) PCT Filed: Jan. 26, 2009

(86) PCT No.: PCT/US2009/032013
§ 371 (c)(1),
(2), (4) Date: Jul. 1, 2010

(87) PCT Pub. No.: WO2009/120401
PCT Pub. Date: Oct. 1, 2009

(65) Prior Publication Data
US 2010/0286919 A1    Nov. 11, 2010

Related U.S. Application Data

(60) Provisional application No. 61/072,311, filed on Mar. 28, 2008, provisional application No. 61/072,248, filed on Mar. 28, 2008.

(51) Int. Cl.
*G01V 1/36* (2006.01)
(52) U.S. Cl.
USPC .................................. 367/43; 367/38; 702/17
(58) Field of Classification Search
USPC ......................... 367/38, 43; 702/17
See application file for complete search history.

(56) References Cited

U.S. PATENT DOCUMENTS

| | | | |
|---|---|---|---|
| 4,757,480 A * | 7/1988 | Gutowski | 367/47 |
| 5,010,526 A * | 4/1991 | Linville et al. | 367/43 |
| 5,010,976 A | 4/1991 | Airhart | |
| 5,035,144 A | 7/1991 | Ausel | |
| 5,060,203 A | 10/1991 | Winterstein | |
| 5,148,407 A | 9/1992 | Haldorsen et al. | |

(Continued)

FOREIGN PATENT DOCUMENTS

| | | |
|---|---|---|
| EP | 1 596 224 | 10/2007 |
| GB | 2 352 293 | 5/2003 |
| JP | 11287865 | 10/1999 |

OTHER PUBLICATIONS

Barmin, M.P. et al. (2001), "A Fast and Reliable Method for Surface Wave Tomography", *Pure Appl. Geophys.* 158, pp. 1351-1375.

(Continued)

*Primary Examiner* — Ian Lobo
(74) *Attorney, Agent, or Firm* — ExxonMobil Upstream Research Company Law Dept.

(57) ABSTRACT

Embodiments use seismic processing methods that account for the spatial variability of surface wave velocities. Embodiments analyze surface wave properties by rapidly characterizing spatial variability of the surface waves in the seismic survey data (302). Filtering criteria are formed using the spatial variability of the surface waves (204). The filtering criteria can then be used to remove at least a portion of the surface waves from the seismic data (206, 319). The rapid characterization involves estimating a local group velocity of the surface waves by cross-correlation of the analytic signals (302).

25 Claims, 12 Drawing Sheets

U.S. PATENT DOCUMENTS

| | | | |
|---|---|---|---|
| 5,241,514 | A | 8/1993 | Ehlers |
| 5,278,805 | A | 1/1994 | Kimball |
| 5,781,503 | A | 7/1998 | Kim |
| 5,971,095 | A | 10/1999 | Ozbek |
| 6,026,057 | A | 2/2000 | Byun et al. |
| 6,253,870 | B1 | 7/2001 | Tokimatsu et al. |
| 6,266,620 | B1 | 7/2001 | Baeten et al. |
| 6,446,008 | B1 | 9/2002 | Ozbek |
| 6,519,205 | B1 | 2/2003 | Baeten et al. |
| 6,612,398 | B1 | 9/2003 | Tokimatsu et al. |
| 6,651,007 | B2 | 11/2003 | Ozbek |
| 6,665,617 | B2 | 12/2003 | Shobayashi |
| 6,691,039 | B1 | 2/2004 | Wood |
| 6,721,662 | B2 | 4/2004 | Wood |
| 6,735,528 | B2 | 5/2004 | Wood et al. |
| 6,834,236 | B2 | 12/2004 | Iranpour |
| 6,836,448 | B2 | 12/2004 | Robertsson et al. |
| 6,903,999 | B2 | 6/2005 | Curtis et al. |
| 6,961,283 | B2 | 11/2005 | Kappius et al. |
| 6,987,706 | B2 | 1/2006 | Wood |
| 7,239,578 | B2 | 7/2007 | Robinson |
| 7,330,799 | B2 | 2/2008 | Lefebvre et al. |
| 7,366,054 | B1 | 4/2008 | Wood |
| 7,379,386 | B2 | 5/2008 | Muyzert et al. |
| 7,382,682 | B2 | 6/2008 | Zerouk |
| 7,382,684 | B2 | 6/2008 | Love et al. |
| 7,397,728 | B2 | 7/2008 | Moore |
| 7,408,836 | B2 | 8/2008 | Muyzert et al. |
| 7,466,625 | B2 | 12/2008 | Robertsson et al. |
| 7,502,690 | B2 | 3/2009 | Thomsen et al. |
| 7,523,003 | B2 | 4/2009 | Robertsson et al. |
| 7,564,740 | B2 | 7/2009 | Wood |
| 7,584,057 | B2 | 9/2009 | Ozbek et al. |
| 7,599,251 | B2 | 10/2009 | Love et al. |
| 2005/0024990 | A1 | 2/2005 | Laake |
| 2005/0152220 | A1 | 7/2005 | Kritski et al. |
| 2007/0043458 | A1 | 2/2007 | Pinnegar |
| 2009/0005999 | A1 | 1/2009 | Wood et al. |

OTHER PUBLICATIONS

Bensen, G.D. et al. (2007), "Processing seismic ambient noise data to obtain reliable broad-band surface wave dispersion measurements", *Geophys. J. Intl.* 169, pp. 1239-1260.

Capon, J. (1969), "High-resolution frequency-wavenumber spectrum analysis", *Proceedings of the IEEE* 57(8), pp. 1408-1418.

Chevrot, S. et al. (2007), "Multiscale finite-frequency Rayleigh wave tomography of the Kaapvaal craton", *Geophys. J. Intl.* 169, pp. 201-215.

Followill, F.E. et al. (1997), Advanced Array Techniques for Unattended Ground Sensor Applications, Lawrence Livermore Nat'l. Laboratory, UCRL-JC-127576, 18 pgs.

Gerstoft, P. et al. (2006), "Green's functions extraction and surface-wave tomography from microseisms in southern California", *Geophysics* 71(4), pp. S123-S131.

Gibbons, S.J. et al. (2006), "The detection of low magnitude seismic events using array-based waveform correlation", *Geophys. J. Intl.* 165, pp. 149-166.

Langston, C.A. (2007), "Spatial Gradient Analysis for Linear Seismic Arrays", *Bulletin of the Seismological Society of America* 97(1B), pp. 265-280.

Langston, C.A. (2007), "Wave Gradiometry in Two Dimensions", *Seismological Society of America* 97(2), pp. 401-416.

Liang, C. et al. (2007), "Ambient Seismic Tomography and Structure of Eastern North America", Center for Earthquake Research and Information, The University of Memphis, 42 pgs.

Park, C.B. et al. (2007), "Multichannel analysis of surface waves (MASW)—active and passive methods", *The Leading Edge*, pp. 60-64.

Nazarian, S. (1984), "In situ determination of elastic moduli of soil deposits and pavement systems by spectral-analysis-surface-waves method", PhD thesis, Chap. 7.2, pp. 163-181, The University of Texas at Austin, Austin, Texas.

Shapiro, et al. (2005), "High-Resolution Surface-Wave Tomography from Ambient Seismic Noise", *Science* 307, pp. 1615-1618.

Yang, Y. et al. (2007), "Ambient noise Rayleigh wave tomography across Europe", *Geophys. J. Int.* 168, pp. 259-274.

Yao, H. et al. (2006), "Surface-wave array tomography in SE Tibet from ambient seismic noise and two-station analysis—I. Phase velocity maps", *Geophys. J. Int.* 166, pp. 732-744.

Yilmaz, O. (1987), "Seismic Data Processing", *Society of Exploration Geophysicists*, Chap. 3.2, pp. 157-166.

*International Search Report and Written Opinion*, dated Mar. 27, 2009, PCT/US2009/032013.

* cited by examiner

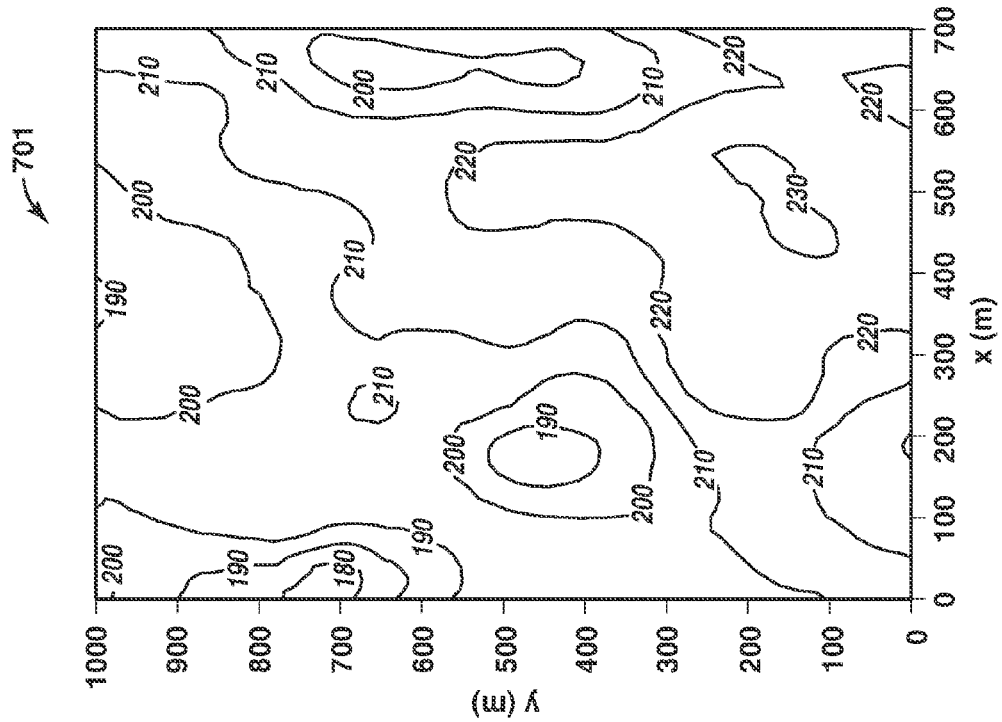
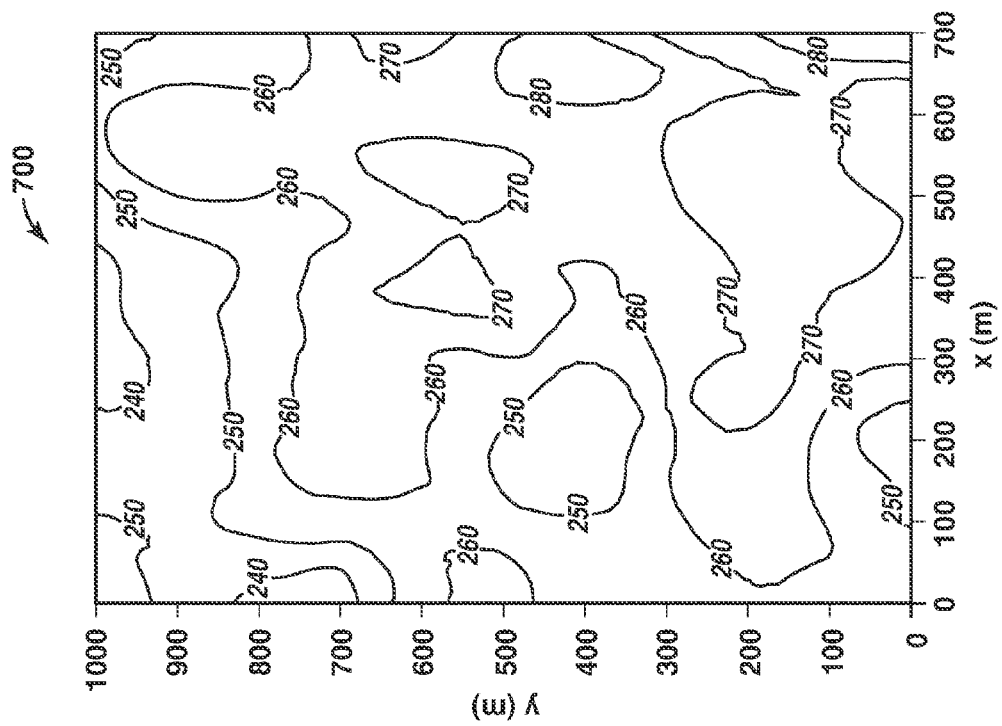
FIG. 7B
FIG. 7A

CHARACTERIZING SPATIAL VARIABILITY OF SURFACE WAVES IN SEISMIC PROCESSING

CROSS-REFERENCE TO RELATED APPLICATIONS

This application is the National Stage of International Application No. PCT/US2009/032013, that published as WO 2009/120401, filed 26 Jan. 2009, which claims the benefit of U. S. Provisional Application No. 61/072,248, filed 28 Mar. 2008, and U.S. Provisional Application No. 61/072,311, filed 28 Mar. 2008, each of which is incorporated herein by reference, in its entirety, for all purposes. This application is related to International Application No. PCT/US2009/032016, which published as WO 2009/120402.

TECHNICAL FIELD

This application relates in general to processing seismic data and in specific to characterizing spatial variability of surface waves by correlation of the surface waves.

BACKGROUND OF THE INVENTION

The goal of seismic processing is to image subsurface reflectors. During a seismic survey, a large amount of the seismic energy generated by a source does not travel vertically as body waves in the earth to reflectors and then return to the geophones, but rather travels horizontally through the shallow near surface of the earth from the source to the geophones. These strong surface waves, sometimes called ground roll, can mask the weaker reflections and should be removed prior to imaging. In other words, the waves of interest are the deeper body waves from reflectors, such as hydrocarbon reservoirs, and the body waves are obscured by overlapping surface waves.

Prior surface-wave removal methods attempt to exploit differences between body waves and surface waves. Two of the most apparent differences are in their relative velocities and frequencies. When multi-component data is available, differences in phase between two or more co-located seismic receivers can also be exploited to mitigate surface waves.

A problem with surface-wave mitigation methods is that some reflector energy is often removed along with the surface-wave energy. The removal may occur for several reasons, including incomplete separation between the velocities and frequencies of surface waves and body waves. Another reason is aliasing of the surface waves, which makes it difficult to remove them by classical Fourier (or dip separation) methods.

In Fourier or dip-separation methods, data are transformed into the Fourier (f-k or frequency-wavenumber) or Radon (τ-p or time-slowness) domain. In these domains, data having different dips in seismic records appear at different locations in the transformed domain. Fourier methods are classical and widely used, for example see O. Yilmaz, Seismic Data Processing, Society of Exploration Geophysicists, 1987, which is hereby incorporated herein by reference. Improvements on simple f-k methods include applying high-resolution spectral techniques to improve the distinction between waves of similar dips, see Iranpour, U.S. Pat. No. 6,834,236 B2, which is hereby incorporated herein by reference. Most such methods stem from the original work of J. Capon, 1969, "High-resolution frequency-wavenumber spectrum analysis," Proceedings of the IEEE, vol. 57, no. 8, 1408-1418, which is hereby incorporated herein by reference.

Radon methods are a more recently developed transform and more computationally expensive, but are sometimes used for surface-wave filtering, for example see Robinson, U.S. Pat. No. 7,239,578 B2, which is hereby incorporated herein by reference. One advantage of the Radon transform is that it does not require regularly spaced trace sampling in the seismic record. Fourier methods suffer from irregular sampling in addition to the previously mentioned aliasing. Preprocessing of the data (interpolation) is often necessary to prepare the data for surface-wave mitigation via Fourier methods, and the interpolation itself may be inaccurate due to aliasing.

Another filtering process that is used to reduce the effects of surface waves is adaptive filtering, which attempts to maximize noise suppression, while protecting the desired signal by allowing the algorithm to perform filtering based on an on-the-fly analysis of the data in each record. For example, see Ozbeck, et al., U.S. Pat. No. 6,446,008 B1, which is hereby incorporated herein by reference. However, note that in this filtering process the adaptivity in these methods is to the characteristics of the data in each record, namely the noise level and statistics. While these methods are adaptive in the specific filters they apply to the record, they still require an a priori assumption of the characteristics of body waves and surface waves. Thus, it is still necessary to define the propagation characteristics of the desired output response, e.g. body waves, and the propagation characteristics of the undesired output response, e.g. surface waves, in the f-k space. The adaptive methods so described cannot change the definition of body wave and surface wave propagation characteristics because there is no analysis of those propagation characteristics except perhaps in an ad hoc manner of analyzing those characteristics at a few selected locations, followed by interpolation between those locations.

A further filtering process that is used to reduce the effects of surface waves is phase-matched filtering, which is a method of removing the dispersion characteristics of the surface waves by flattening the surface waves in a seismic record. Phase matching also compresses the long and ringy surface-wave waveform in the time domain by removing the frequency-dependent velocity structure of the surface wave. This produces a surface wave that is not only flat but compact in the time-space domain of the seismic record. This compression of the surface wave is very advantageous because it allows small windows to be used over the limited frequency range of the surface wave to remove the surface wave. In an improvement to narrow time windows, Kim, U.S. Pat. No. 5,781,503, which is hereby incorporated herein by reference, teaches the use of a spatial low-pass filter on the time-aligned and compressed surface-wave data.

Despite the value of aligning and compressing the surface waves, and the subsequent spatial low-pass filtering, it is still necessary with phase-matched filtering of any kind to perform an analysis of the dispersion characteristics of the surface waves. These dispersion characteristics, or frequency dependent velocities, are again traditionally analyzed on some representative records from around the survey area, and ad hoc methods are used to interpolate the dispersion characteristics to locations not analyzed.

FIG. 1 depicts a typical process 100 to mitigate surface waves. Various filtering techniques referred to above may be used in the process 100. The process starts with one or more seismic records 101 for a particular region of interest. In block 102, the records 101 are analyzed at very few, selected, locations in the seismic survey. The analysis involves determining the velocities and dispersion curves at the very few, selected locations. The data resulting from block 102 are sparsely sampled surface-wave properties 103. With this data 103, the process then designs filtering criteria to separate surface waves from body waves in block 104. The resulting sparse filtering criteria 105 are then interpolated by the process in block 106 for every location in the record and for every record in the input data 101. The interpolated criteria 107 are used in block 108 by the process for the mitigation of surface waves in the input data 101 to produce data 109 with mitigated surface waves. Note that in other processes, the surface-wave properties are interpolated for every record instead of the filtering criteria being interpolated, but they result in the same inexact knowledge of the surface wave properties and/or the filtering criteria to separate surface waves from body waves.

In earthquake seismology, surface wave signals are cross-correlated between two seismic stations, and seismic tomography is employed to estimate the group velocities of the surface waves between the stations, for example see Shapiro et al., "High-Resolution Surface-Wave Tomography from Ambient Seismic Noise," Science Vol. 307, pp. 1615-1618, 2005, which is hereby incorporated herein by reference. This approach is time consuming and computationally expensive, since (1) tomography needs to be employed to overcome sparse spatial sampling, and (2) typically N×N cross-correlations are computed to make full use of available sparse data, where N is the number of seismic stations. Furthermore, in earthquake seismology, surface-wave signals are often directly cross-correlated to obtain the group velocities of the surface waves, without converting the surface-waves into analytic signals. Note that this is possible only when the distance between the seismic stations is much larger than the wavelength of the surface waves, and thus is not applicable to exploration seismology.

In US Patent Application 2005/0152220 A1, which is hereby incorporated herein by reference, Kritski and Amundsen disclose the use of cross-correlation of surface waves recorded on nearby traces in a vertical seismic profile (VSP) to obtain the shear-wave velocity in the region between their depth levels. However, this methodology involves attempting to estimate the entire dispersion curve (shear-wave velocity vs. frequency) by first transforming the data into the wavelet transform domain before correlation.

Similarly, U.S. Pat. No. 6,612,398 B1 to Tokimatsu et al. and U.S. Pat. No. 5,035,144 to Aussel, both of which are hereby incorporated herein by reference, teach the use of cross-correlation to obtain the shear-wave velocity vs. frequency for the fundamental mode of a surface wave. These disclosures obtain the full dispersion curve, and hence first perform a frequency transform before correlating. Aussel constructs the envelope function using the analytic signal many times, namely for each individual frequency component. Note that Tokimatsu operates with small areas at ground level, and Aussel is operative for small quantities of data obtained in nondestructive testing experiments with 2 cm thick material samples.

In U.S. Pat. No. 6,266,620 B1, which is hereby incorporated herein by reference, Baeten and Lemenager teach a method of automatically detecting the cone of the surface waves or ground roll waves. It is the object of that method to identify where on the seismic record surface-wave energy resides, in order that an adaptive filter can be applied to the filtering of that energy. Accordingly, that method relies primarily on amplitudes of surface waves being larger than those of other types of signals, and employs certain types of amplitude thresholding, blocking, and merging to identify and isolate the surface-wave noise. While they perform cross-correlation between the adjacent traces to calculate the velocities of the surface waves in the course of their methodology, the cross-correlation is made between the seismic traces without turning the traces into complex analytic signals. This results in velocity estimates that are in between the phase and the group velocities of the surface waves due to their dispersive nature. Also note that while the methods in U.S. Pat. No. 6,266,620 B1 also turns the traces into analytic signals, the magnitude of the complex analytic signal, or the envelope signal, is only used for instantaneous amplitude estimation. This is because the method relies heavily on certain amplitude criteria. Since the goal of the method is to identify the surface wave noise cone, the output is a range of velocities per trace that supposedly confine all the surface wave noise.

In U.S. Pat. No. 5,241,514 A, which is hereby incorporated herein by reference, Ehlers teaches a method of identifying, characterizing, and mapping seismic noise, which includes surface-wave noise. This method rapidly characterizes surface-wave scatterer location and strength, assuming the surface-wave velocity is neither space nor frequency dependent. As part of the beam steering process, Ehlers teaches estimating the strength and direction of scatterers by varying the velocity of surface waves at each azimuth, in order to identify which combination of velocity and location provides the most energetic display of surface-wave energy. However, no allowance is made for the variability of surface wave along a propagation path for a fixed azimuth. As in the radar field, which that method is based on, velocity along a path is fixed and assumed known for each scan. In the presence of velocity heterogeneity, that method has an ambiguity between scatterer location and velocity. Furthermore, the method does not vary the velocity of the surface waves as a function of frequency, and so is not readily applicable to surface waves that exhibit strong dispersion.

SUMMARY OF THE INVENTION

Embodiments of the present invention are directed to systems and methods which use seismic processing methods that account for the spatial variability of surface wave velocities.

One embodiment is a method of processing exploration seismic survey data from a region, wherein the seismic survey data comprises body waves and surface waves, and the region comprises a plurality of locations. The method comprises receiving seismic survey data from at least one sensor; analyzing at least one surface wave property for each location in the region; designing filtering criteria to separate at least a portion of the surface waves from the body waves in the seismic survey data using the surface wave property; and applying the criteria to the seismic data to remove at least a portion of the surface waves from the seismic survey data.

Another embodiment is a method of processing exploration seismic survey data from a region, wherein the seismic data comprises body waves and surface waves, and the region comprises a plurality of locations. The method comprises characterizing a spatial variability of the surface waves in the seismic survey data; determining whether the region can be subdivided into sub-regions based on the characterization, wherein the spatial variability is relatively constant within the sub-region; if the determining is affirmative, estimating at least one local dispersion curve for the spatial variability in each sub-region; if the determining is negative, forming at least one dispersion curves for the spatial variability for each location in the region; using the dispersion curves from one of the estimating and the forming, extrapolating the dispersion curves over a frequency band; and using the extrapolated dispersion curves to remove at least a portion of the surface waves from the seismic survey data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings, in which:

FIGS. 7A and 7B depict examples of the spatially-varying dispersion curves at two different frequencies, according to embodiments of the invention;

DETAILED DESCRIPTION OF THE INVENTION

Figure 1:
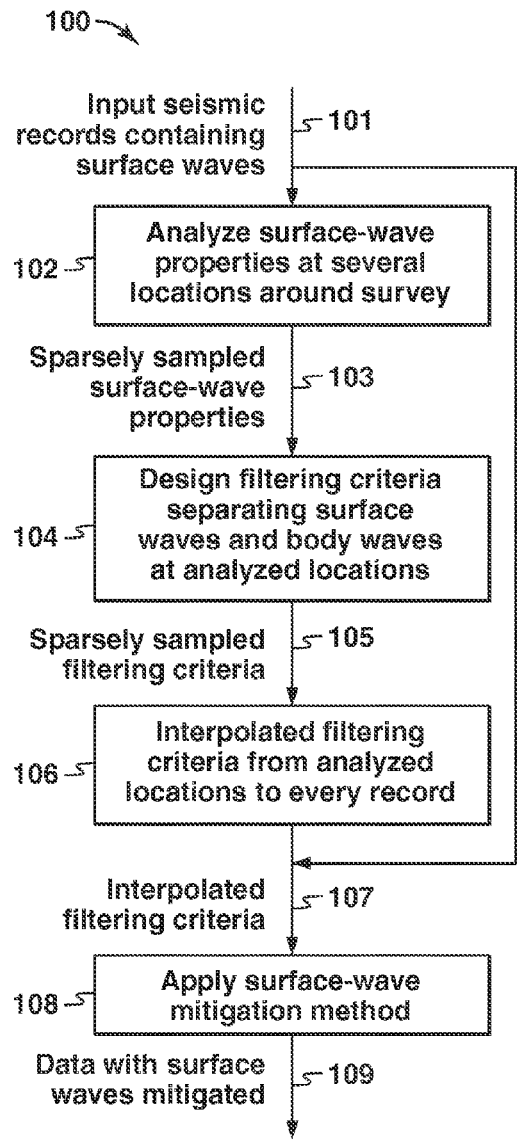
FIG. 1 depicts a prior art process to mitigate surface waves.

Note that there is another limitation on Fourier methods, namely spatial variability of surface wave properties. This problem is observed in the prior art, and yet has not been dealt with. Separating surface waves from body waves requires a decision about the specific threshold for separation, namely at what velocity (or range of velocities) are the surface waves and body waves? Filtering requires setting these thresholds to optimally remove the noise. Deciding on these thresholds is typically performed by analyzing seismic records in the data, perhaps ones from different parts of a seismic survey. No matter how thorough an analysis is attempted, it is too labor intensive to manually identify these velocity thresholds on any but a small subset of the data. Furthermore, it is not apparent how these threshold estimates at different locations can be used for surface-wave mitigation, even if one performed thorough analysis over the entire survey area.

Typically, very little is known about spatial variability of the surface-wave velocities in processing seismic data except to perform some kind of (usually ad hoc) interpolation of the velocities between the available analysis points. Nonetheless, spatial variability exists, and processes attempt to adjust for it by widening their velocity zones for surface waves and body waves, so that each zone includes not only the velocity at any one location but also the anticipated variability. The problem with widening windows is that the ability to distinguish the surface waves and body waves on any one record is reduced because the zones for each are wider. This is an inherent tradeoff between distinguishing and addressing spatial variability when spatial variability is addressed in this ad hoc manner.

Embodiments of the present invention are directed to systems and methods which use seismic processing methods that include estimates for the variability of surface waves for changes in their velocities as a function of 2-D space and frequency. In other words, embodiments incorporate spatial variability of surface-wave velocities into surface wave mitigation. More specifically, embodiments determine (i) how local properties of surface waves can be estimated over the entire seismic survey area, and (ii) how the estimated local properties can be used for surface-wave mitigation by negating the propagation effects of surface waves through spatially varying media. Note that while embodiments are applicable to multi-component data, the embodiments do not require more than one component, since the method does not exploit phase relationships (such as polarization attributes) between co-located receivers. Note that multi-component data is seismic data measured by two or more co-located sensors responsive to ground motion in different directions.

Embodiments determine the extent to which the region under study is in fact spatially variable and in need of the benefits of those methods. In other words, embodiments rapidly characterize or estimate the variation in surface-wave velocity for a region. The output of the characterization is useful in determining whether the full surface-wave mitigation methods must be employed. Thus, the full surface-wave mitigation method may be unnecessary for some or all portions of the region. Such portions or subdivisions of the survey area or region have surface-wave properties that can be assumed to be approximately constant. This subdivision would allow methods of surface-wave mitigation to be employed in the sub-regions. The output of the rapid characterization would also determine the size of analysis boxes in the estimation of local surface-wave dispersion curves. Embodiments operate to generate a spatial map that quantitatively depicts the variability of surface wave velocities as a function of space.

Note that embodiments recognize that the prior art techniques do not explicitly take into account the fact that the velocities of the surface waves vary when analyzing the properties of surface waves to distinguish them from the deeper reflective body waves. Thus, the prior art approach of FIG. 1 may perform adequately in suppressing surface waves from seismic data when the characteristics of the surface waves do not vary by more than a small percentage (<10%). As the percentage change of the surface wave velocities and/or dispersion characteristics over the survey area becomes larger, all of the prior art methods will suffer from the inexact characterization of that spatial variability, resulting in only approximate removal of surface waves and/or harming the signal of the body wave reflections (reducing their strength or modifying their phase and amplitude spectra).

Embodiments also recognize that prior art techniques believe that comprehensive analysis of surface-wave properties is too onerous and/or to error-prone to be performed. Thus, prior art techniques limit their analysis to estimate the properties at a few selected locations. Other techniques attempt to characterize the shallow near-surface by acquiring auxiliary measurements, see for example US Patent Application 2005/0024990 A1 to Laake, which is hereby incorporated herein by reference, rather than extracting near-surface characterization from the data themselves. Other techniques, for example U.S. Pat. No. 6,266,620 B1 to Baeten et al., which is hereby incorporated herein by reference, even when attempting automated detection of the location of surface waves in a seismic record, only contemplates determining the minimum and maximum surface-wave velocity in a survey. Other techniques, such as US Patent Application 2005/0143924 A1 to Lefebvre et al., which is hereby incorporated herein by reference, attempt to estimate the entire dispersion curve, but only for a very small spatial scale by narrow bandpass filtering of a very limited amount of data, similar to the geotechnical and local scales typical of well-known methods such as "Spectral Analysis of Surface Waves (SASW)" (Nazarian, S. (1984); "In situ determination of elastic moduli of soil deposits and pavement systems by spectral-analysis-of-surface-waves method," PhD thesis, The University of Texas at Austin, Austin, Tex.); "Multichannel Analysis of Surface Waves (MASW)" by Choon B. Park, Richard D. Miller, Jianghai Xia, and Julian Ivanov; and "Multichannel analysis of surface waves (MASW); active and passive methods," The Leading Edge (Tulsa, Okla.) (January 2007), 26(1):60-64, the disclosures of which are hereby incorporated by reference. Note that these methods attempt to invert for the near-surface shear velocity and do not attempt to mitigate surface waves. Also, these methods are specifically designed to analyze the seismic surface waves and not the seismic body waves. Therefore, their spatial sampling rates are higher than those in typical exploration seismic surveys in order to avoid aliasing of surface waves.

Embodiments of the invention operate to estimate the spatially variable velocity along the direct path of surface waves from source to receiver. Once that spatially variable velocity is accurately estimated, analysis and removal of scattered surface waves and/or direct surface waves is possible. The spatially variable velocity analysis yields local surface-wave properties for the survey area, specifically surface-wave phase and group velocities at each spatial location. The analysis at every location in the survey will have correspondence to geological and topographical features of the survey area, as well as having correlation to other related geophysical parameters such as shear-wave statics. Embodiments note that the use of the surface-wave properties and their corresponding filtering criteria should be different for each trace in the record.

Figure 2:
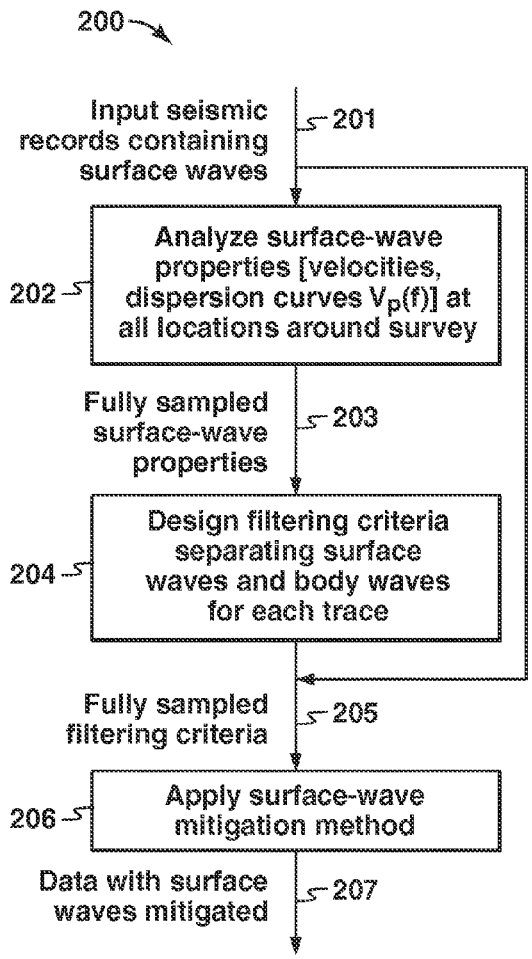
FIG. 2 is a process to mitigate surface waves, according to embodiments of the invention.

FIG. 2 depicts a process 200 to mitigate surface waves according to embodiments of the invention. The process starts with one or more seismic records 201 for a particular region of interest. The seismic record may be created by, for example, firing a shot of dynamite or vibrating the surface of the earth. A plurality of sensors located on or in the surface of the earth record the waves from the shot. In block 202, the records 201 are analyzed at all or substantially all of the locations in the survey area, which creates a data set 203 of fully sampled surface-wave properties in which no interpolation is necessary. The size or granularity of each location may be selected based on the data. For example, the size of each location may be based on the size of the sensor grid used to form the data, with the location size being set to the closest spacing in the sensor grid.

The analysis involves determining the velocities and dispersion curves at the locations. With this data 203, the process then designs filtering criteria to separate surface waves from body waves in block 204. Note that the filtering criteria are correct for each trace in the data set 203. Block 204 results in a set of fully sampled filtering criteria 205. The criteria 205 is then applied to the records 201 in block 206 to mitigate the surface waves in the input records 201 to produce data 207 with mitigated surface waves. Note that the analysis of FIG. 2 is performed at all or substantially all of the locations of the survey, such that every source receiver pair in the entire survey would be analyzed. To obtain such data, typically many sensors are placed at many points within the region, often on a regular grid. If there are missing sensors, the data for these areas may be interpolated, or the analysis may focus on areas with shots, but no sensors.

Figure 3A:
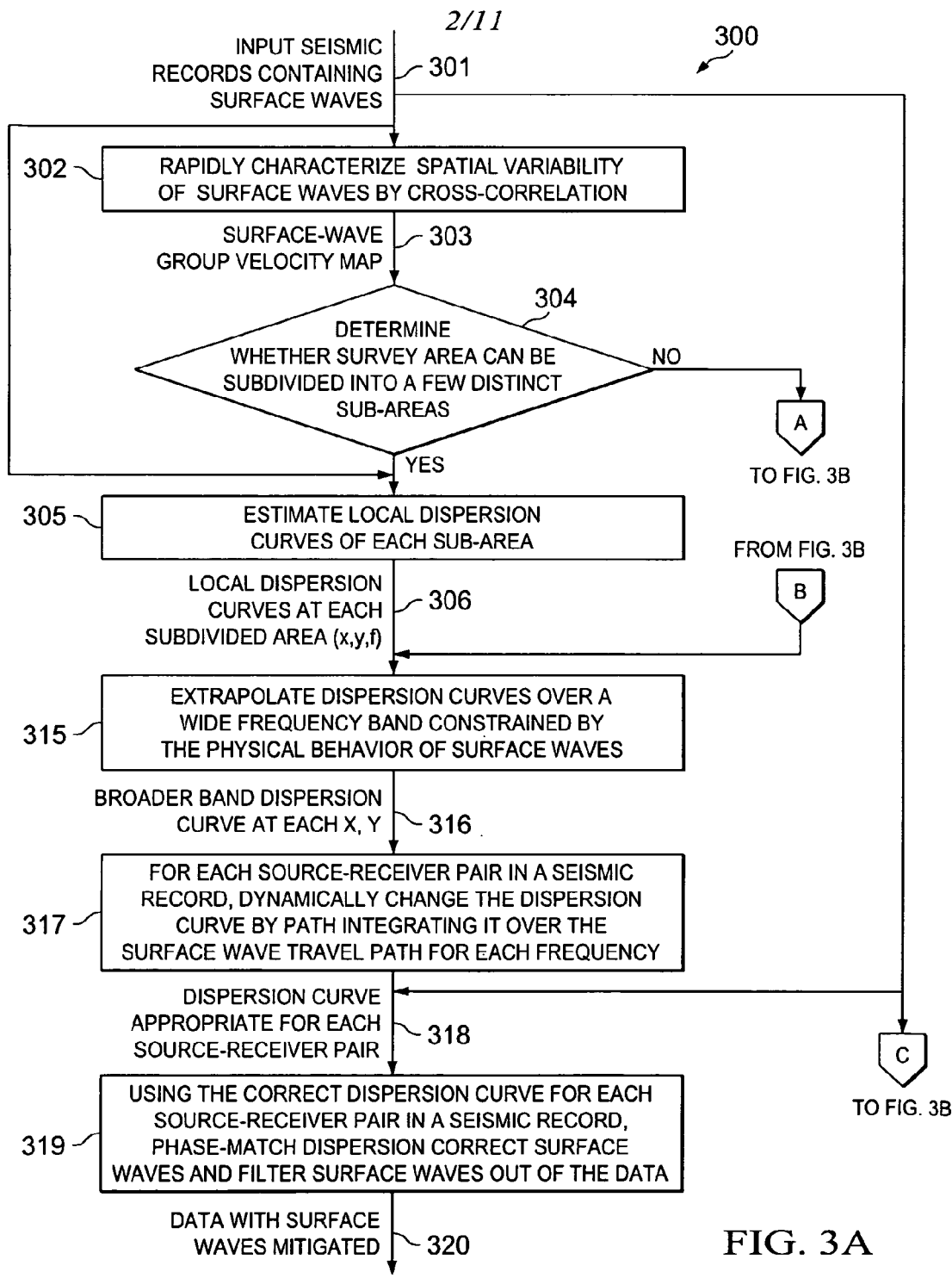
FIGS. 3A and 3B depict another process to mitigate surface waves, according to embodiments of the invention.
Figure 3B:
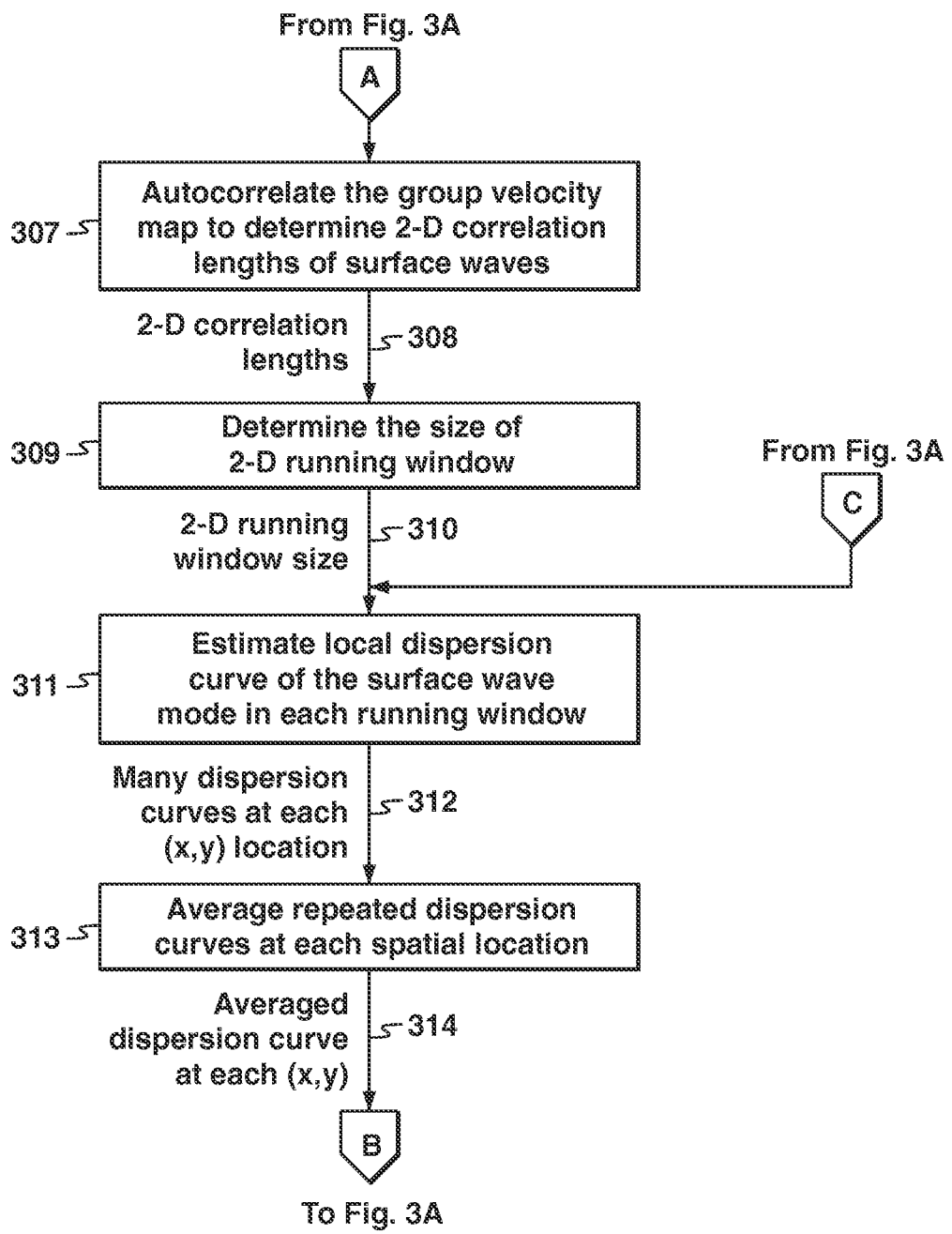
Figure 12:
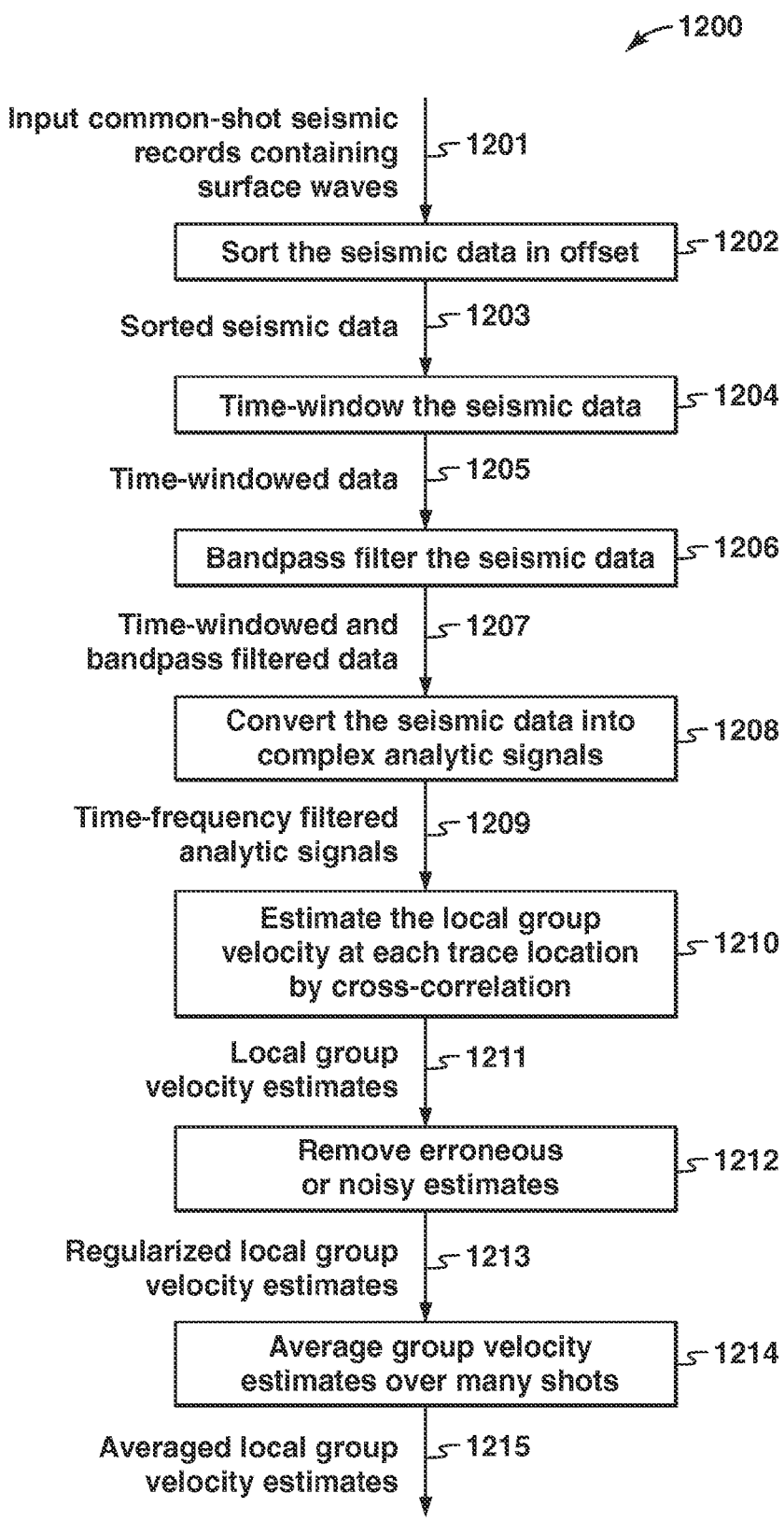
FIG. 12 depicts an example of a process to characterize the spatial variability of the surface waves by cross-correlating dominant surface wave modes, according to embodiments of the invention.

FIGS. 3A and 3B depict another process 300 to mitigate surface waves according to embodiments of the invention. The process starts with one or more seismic records 301 for a particular region of interest. In block 302, the process characterizes the spatial variability of the surface waves in the records 301 by cross-correlating dominant surface wave modes. This block operates as shown in FIG. 12 discussed below. The output of block 302 is a map 303 of the average group velocity.

Figure 4:
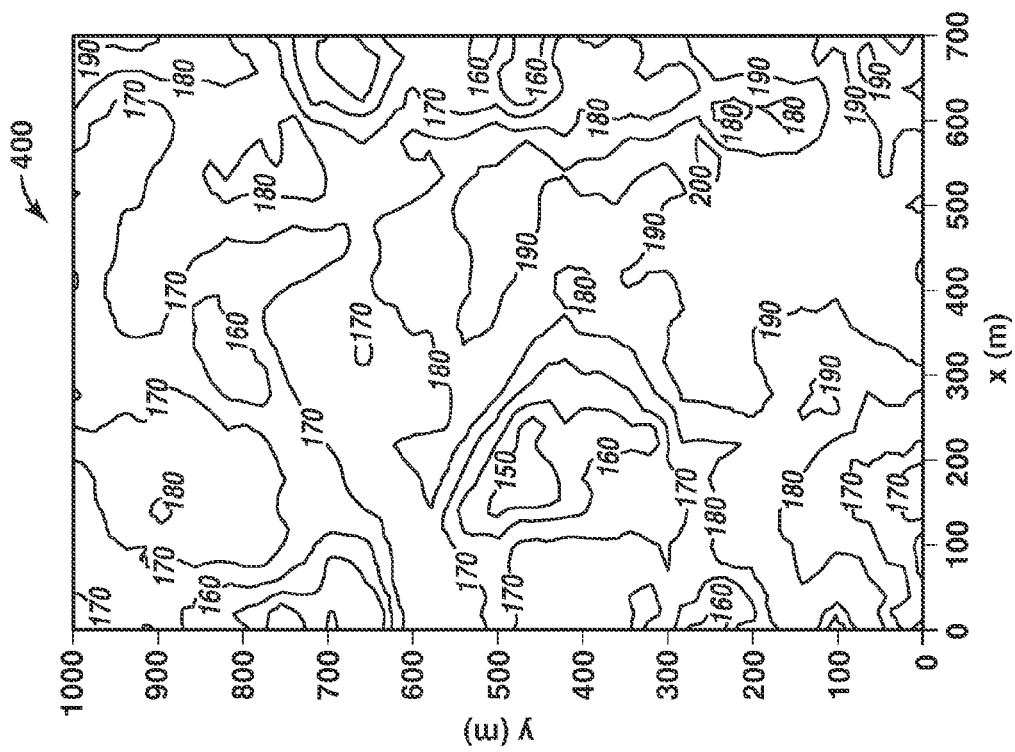
FIG. 4 depicts an example of an average surface-wave group velocity map of the survey area, according to embodiments of the invention.

FIG. 4 depicts an example 400 of an average surface-wave group velocity map of the survey area 303 that would be produced by block 302. Note that FIG. 4 shows that the survey area exhibits a continuous spatial variation of surface wave properties.

The process uses the average group velocity map 303 to determine in block 304 whether the survey area can be subdivided into one or more sub-areas in block 304. Note that in each sub-area the surface wave velocities can be assumed to be relatively constant, e.g. within ≦10% variability, depending on the frequency, average speed and other factors. If the determination is affirmative, then the process proceeds to block 305, where the process estimates the local dispersion curve within each sub-area using surface-wave data 301, using the same method for estimating the dispersion curve described below, but in this case only applied once to each subregion. Using sub-areas will save processing time and costs without overly affecting accuracy. The output from block 305 is a collection of local dispersion curves 306 for each subdivided area. The collection of curves is then used in block 315.

If the determination of block 304 is negative, meaning that the survey area cannot be subdivided into a few sub-areas with distinct boundaries, then the process proceeds to block 307, where the process starts a sub-process comprising blocks 307, 309, 311, and 313 to determine the dispersion curve at each spatial (x,y) location in the survey region.

The sub-process begins in block 307 by performing 2-D autocorrelation of the surface-wave group velocity map 303 estimated in block 302 to calculate the correlation lengths of the group velocities in 2-D space. Block 307 produces a set 308 of 2-D correlation lengths. Note that it is assumed these correlation lengths 308 also represent the correlation lengths of surface wave properties in 2-D space, and hence represent a desirable window size for the analysis in block 311. Window sizes larger than these coherence lengths may encounter large spatial variability for the dispersion estimates made in the next step to be considered a local property of the surface waves. Smaller window sizes would increase processing time and costs.

Figure 5:
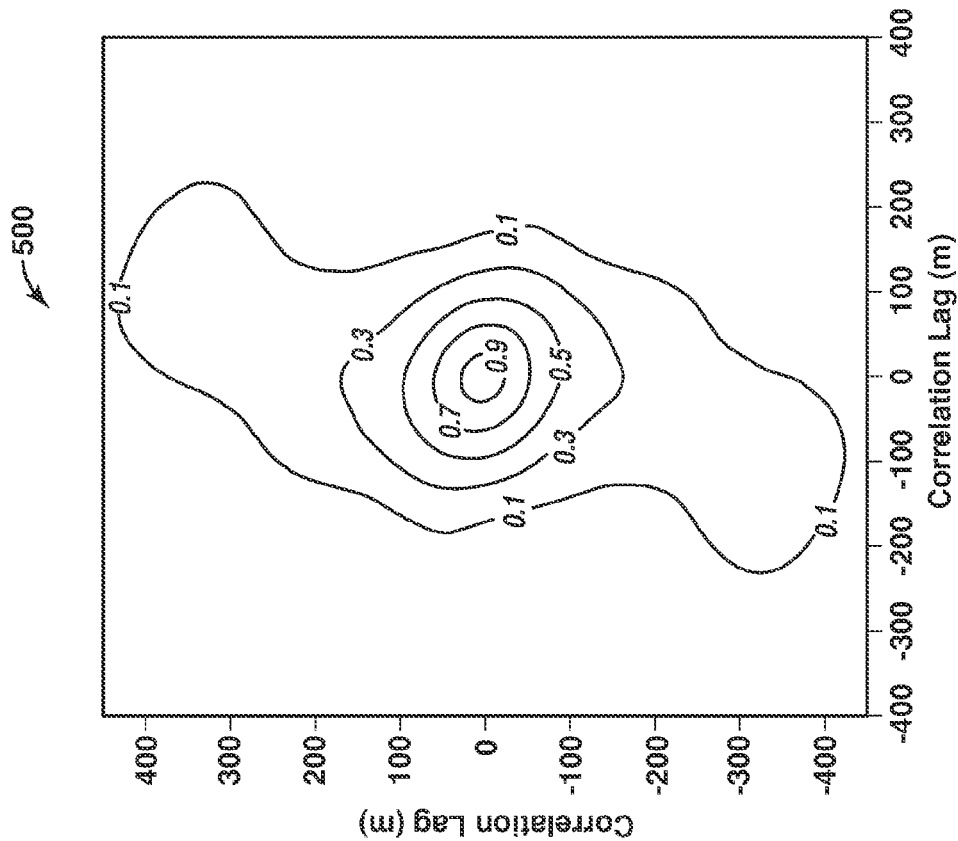
FIG. 5 depicts an autocorrelation of the map of FIG. 4, according to embodiments of the invention.

FIG. 5 depicts a correlation map 500, which is the result 308 of the operation of block 307 to auto-correlate the map 400 of FIG. 4 in 2-D space. Note that map 400 could not be sub-divided because there are no sub-regions where the velocity is constant. Thus, the process begins operations of the sub-process of blocks 307, 309, 311, and 313. From analysis of map 500, the correlation lengths of the surface-wave properties can be found to be 400 meters (m) and 200 m respectively, when 90% correlation threshold is used. Note that 90% threshold means that the correlation function value drops to 0.1 from its peak value of 1.0.

Using the set 308, the sub-process then proceeds with block 309 that determines the 2-D running window size for local dispersion curve estimation, also referred to as "beam forming." The result is one or more values 310 denoting the window size. The running window size is the size of the 2-D array used for beam forming in block 311. Note that the running window size ideally would be identical to the correlation lengths 308. However, the process may use a running window size that is greater than the correlation lengths if the spatial sampling rate is much lower than the Nyquist sampling rate, or if the beamwidth of the effective array formed by the traces in the running window does not provide sufficient resolution to reliably separate different modes in the beam formed field. In other words, if the window is too small, then there may not be enough survey traces to form an adequate estimate. Thus, increasing the window size is desirable.

The sub-process then operates block 311 that windows the survey area using one or more 2-D running windows having the length as specified by value 310. The seismic data within each window is then used for estimation of local dispersion curves within the windowed area. The results of block 311 are a set 312 of dispersion curves at each (x,y) location. The dispersion curves can be formed by transforming seismic data into the frequency-wavenumber domain or frequency-phase slowness domain, and by detecting the peaks within the frequency band where surface waves are sufficiently energetic. While transforming data into the frequency-wavenumber domain, data from different azimuths are merged along the offset direction, so that the resulting offset sampling can effectively satisfy the Nyquist sampling criterion. The seismic data can be filtered in time or frequency before the transform to increase the signal-to-noise ratio. If common-shot gather data, meaning one shot and many receivers are used for beamforming, the seismic traces of the receivers within the window are used for beamforming. If common-receiver, meaning one receiver and many shots to gather data are used, only the traces of the shots within the window are used. If super-shot gather data, meaning a grouping of the receiver traces from more than one shot together as one larger entity, are used, both the shots and the receivers need to be within the window. Note that block 311 may be operative for each of the different modes or velocities of the surface waves, with a curve being produced for each mode in addition to each location.

Figure 6:
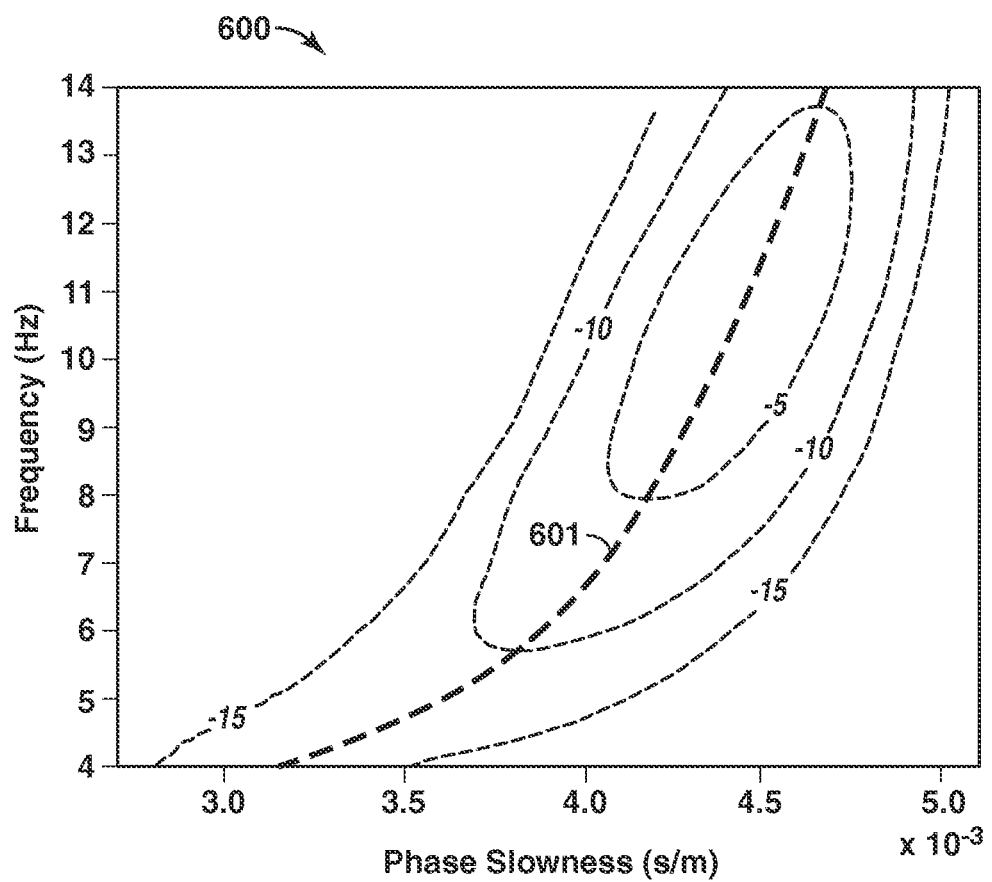
FIG. 6 depicts an example of a beamformed field in the frequency-phase slowness space, according to embodiments of the invention.

Continuing with the example of FIG. 4, from map 500, the survey area would be subdivided into 400 m by 200 m overlapping running windows, and the dispersion curves of each local or subdivided area are estimated by array steering or beam forming. FIG. 6 depicts an example 600 of a beamformed field 312 in the frequency-phase slowness space, which is derived from analyzing the seismic record (shot or receiver gather) from one 2-D spatial running window, where the dispersion curve can be estimated by automatic peak detection. The line 601 is the peak of the beamformed field at each frequency. Note that curve 601 derived from beamformed field 600, is for spatial locations (x,y) within the 2-D running window such that there would be many curves for the entire survey area, one or more at each (x,y) location, as discussed below.

Block 311 is repeated to form many different gathers, e.g. multiple common-shot, multiple common-receiver, multiple super-shot, and/or various combinations of one or more common-shot, common-receiver, and super-shot gathers to obtain many local dispersion curve estimates 312 over the entire survey area. The running window is moved with sufficient overlap to obtain estimates of the local dispersion curves at different spatial locations. The overlap regions of the sliding window should be determined by the spatial redundancy of the seismic data. When seismic data are rather sparse for an exploration seismic survey, the process operates with a conservative overlap of 75% in each spatial domain and provides sufficiently many dispersion curve estimates for averaging.

The multiple estimates of the dispersion curves 312 is then averaged by the sub-process in block 313 for each spatial location. Block 313 results in a set 314 of averaged dispersion curves at each (x,y) location. This set is then used in block 315. Further processing would flatten that particular mode of the surface waves by removal of the dispersion effect using Eq. (2) described below in preparation for mitigation.

Continuing with the example of FIG. 4, using the dispersion curves, e.g. 600, for overlapping running windows are averaged at each spatial location to obtain the spatially-varying dispersion curves over the survey area, creating a full volume of dispersion curves ($v_p$ (x,y,f), i.e. velocity as a function of (x,y) location and frequency f). At each individual frequency, e.g. frequency $f_0$, a map of velocity is obtained, $v_p$ (x,y,$f_0$), such that the dispersion volume can be observed one frequency at a time as a map view, where it is understood that frequency is constant in each map. FIGS. 7A and 7B depict examples 700, 701 of the spatially-varying dispersion curves at two different frequencies, namely map 700 is for 5 Hertz (Hz) and map 701 is for 10 Hz. Note that the maps depict the entire area of the survey. Further note that maps 700 and 701 are examples of the output 314 of block 313, and there would be more maps for different frequencies.

The process in block 315 uses either the set of curves 306 for block 305 or the set of curves 314 from block 313. With either data, the block 315 operates to extrapolate the curves over the entire frequency band while following the physical behavior of surface waves. In the low-frequency end, e.g. the dispersion curves are extrapolated so that (i) phase velocity is a monotonically decreasing function of frequency, (ii) group velocity is a monotonically decreasing function of frequency, and (iii) phase velocity equals group velocity when frequency f=0. The low frequency end is the range below what is known in the art as the Airy phase, usually 0-3 Hz for surface waves in exploration seismic data, and the Airy phase is at a frequency corresponding to the minimum of the group velocity curve. In the high-frequency end, e.g. the dispersion curves are extrapolated so that (i) phase velocity is a monotonically decreasing function of frequency, (ii) group velocity is a monotonically increasing function of frequency, and (iii) phase velocity and group velocity asymptotically reach the same value as frequency goes to infinity. The high frequency end is the frequency range above the Airy phase, often 10-25 Hz for surface waves in exploration seismic data. The output of block 315 is a set 316 of broader band local dispersion curves.

The process then proceeds to use the broad band dispersion curves at all (x,y) locations. Conventionally, the curve may be applied at one location (x,y) to calculate the phase term and then apply it to all the traces in the shot gather whose shot is located at the same (x,y) (or the receiver gather whose receiver is located at that (x,y)). However, this could not make full use of the value of having the dispersion curves at all locations, because having them at all locations allows the calculation of a phase term that is different for each trace in the shot record. Alternatively, the process in the present invention may proceed with blocks 317 and 319, which dynamically changes the dispersion curves as a function of both source and receiver positions within the gather (block 317) to produce a set 318 of dispersion curves appropriate for each source-receiver pair. Blocks 317 and 319 are described in more detail with respect to FIG. 12 of U.S. Provisional Patent Application No. 61/072,311, "Surface Wave Mitigation in Spatially Inhomogeneous Media". Processing at block 317 involves having each trace in the seismic record having an associated travel time for the different modes of the surface wave at each frequency. Thus, for each source receiver pair, the seismic record dynamically changes the dispersion curve by path integrating over the surface wave travel path for each frequency. Note that this may be viewed as each source receiver pair having its associated velocity as a function of frequency.

The data 318 is used to mitigate surface waves in the input records 301 in block 319. Thus, using the process 300 trace by trace dispersion correction can be performed for each source receiver pair in the seismic record, and thus can be applied to the record to mitigate surface waves. One manner to mitigate the surface waves is phase matching, which flattens and compresses the surface waves, such that the surface waves can be filtered or windowed out of the data without degrading the signal of the body waves. Other ways of mitigating the surface waves can be used, such as time-reversal back propagation or focal transformation, as discussed below. The resulting data 320 has less noise from surface waves and thus allows for better analysis and processing of the body waves.

Figure 8:
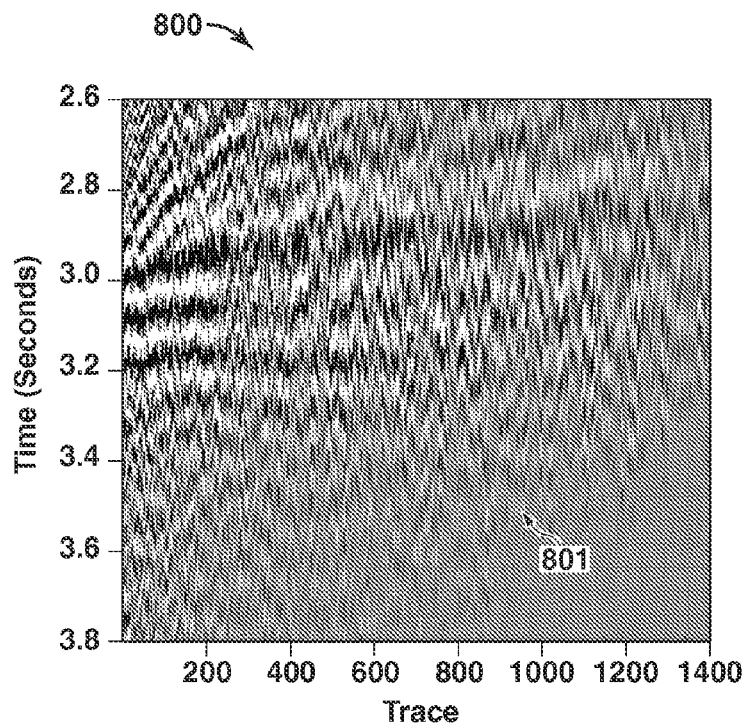
FIG. 8 depicts an example of the seismic data after the output 107 of block 106 of FIG. 1 is used to phase-correct, or flatten, each trace in a seismic record.

FIG. 8 depicts an example 800 of phase matching using the output of block 106 of FIG. 1, namely the interpolated filtering criteria 107. FIG. 8 is derived from the conventional method of FIG. 1 using a single reasonable dispersion curve for the entire record. FIG. 8 depicts dispersion corrections or phase matching for the slowest-velocity surface wave mode in the record. Note region 801 with poor flattening of the surface waves.

Figure 9:
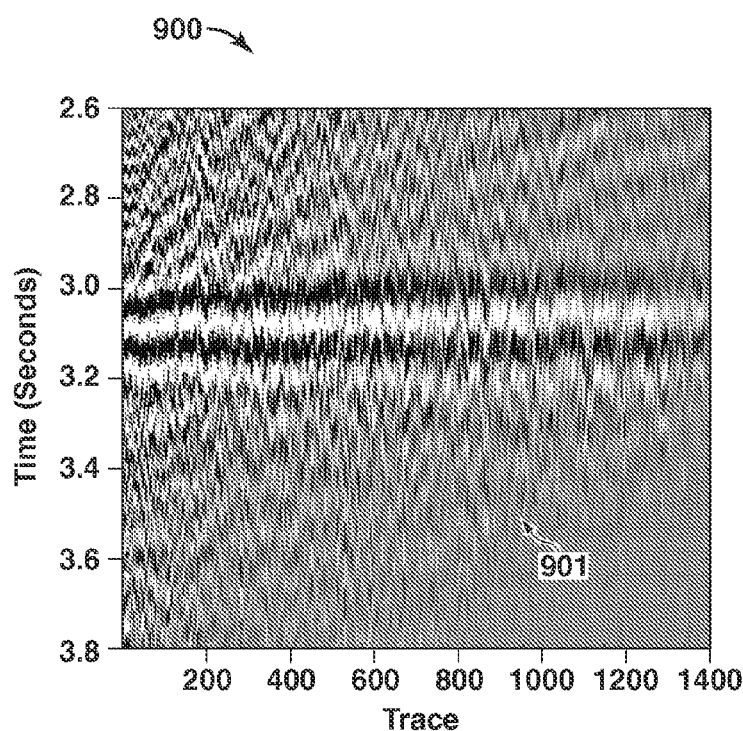
FIG. 9 depicts an example of the seismic data after the output 318 of block 317 of FIG. 3 is used to phase-correct, or flatten, each trace in a seismic record, according to embodiments of the invention.

FIG. 9 depicts an example 900 of phase matching using the output 318 of block 317. FIG. 9 shows dispersion corrections or phase matching for the slowest-velocity surface-wave mode in the record. FIG. 9 is derived using unique dispersion correction that is estimated and applied for each trace in the record. Note that the surface waves 900 exhibits better flatness and a tighter more continuous wavelet trace-to-trace, e.g. region 901, than does the surface wave in the record of FIG. 8.

Figure 10:
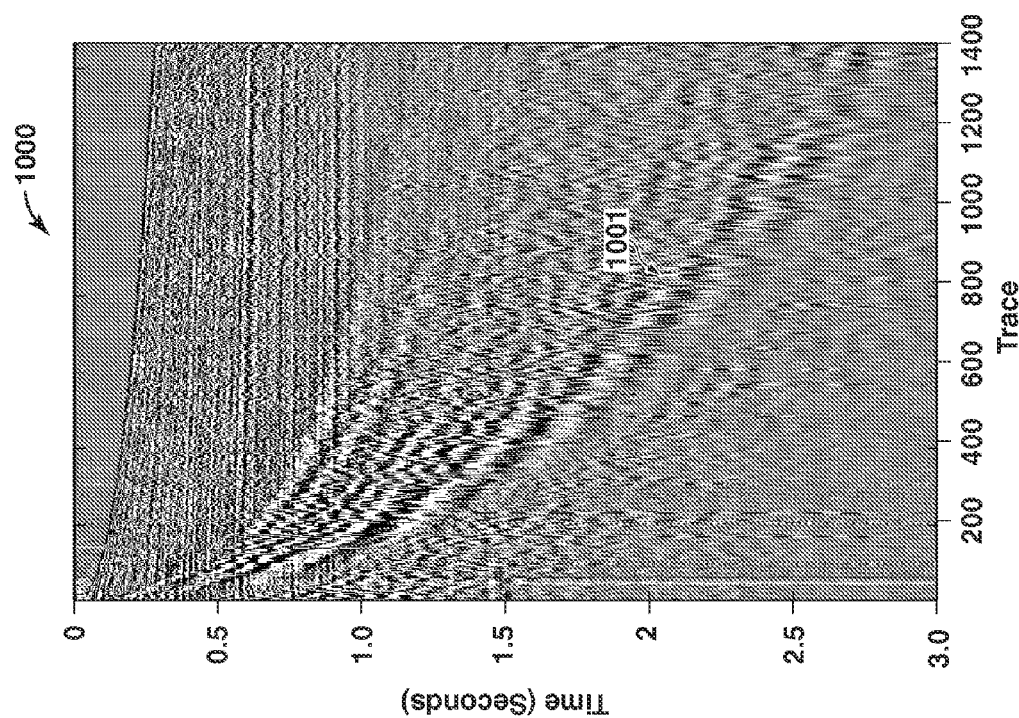
FIG. 10 depicts an example of the output of the process of FIG. 1 with surface waves mitigated.

FIG. 10 depicts an example 1000 of the output of block 108 of FIG. 1, namely the data with surface waves mitigated 109. FIG. 10 is derived from the conventional method of FIG. 1 using a filter based on the phase matching of FIG. 8. In FIG. 10, surface waves remain in the data at the top of the mitigation window 1001, because surface wave dispersion was not completely removed and some of the dispersed surface wave fell outside the mitigation window. The mitigation window was kept narrow in order to minimize the effect of the windowing on the body wave data. Of course, better surface wave mitigation could be achieved by widening the window in the mitigation step in FIG. 10. However, this would include more body wave data in the mitigation window and degrade the body wave signal. Hence, the results suffer from the tradeoff of surface-wave mitigation for body wave preservation.

Figure 11:
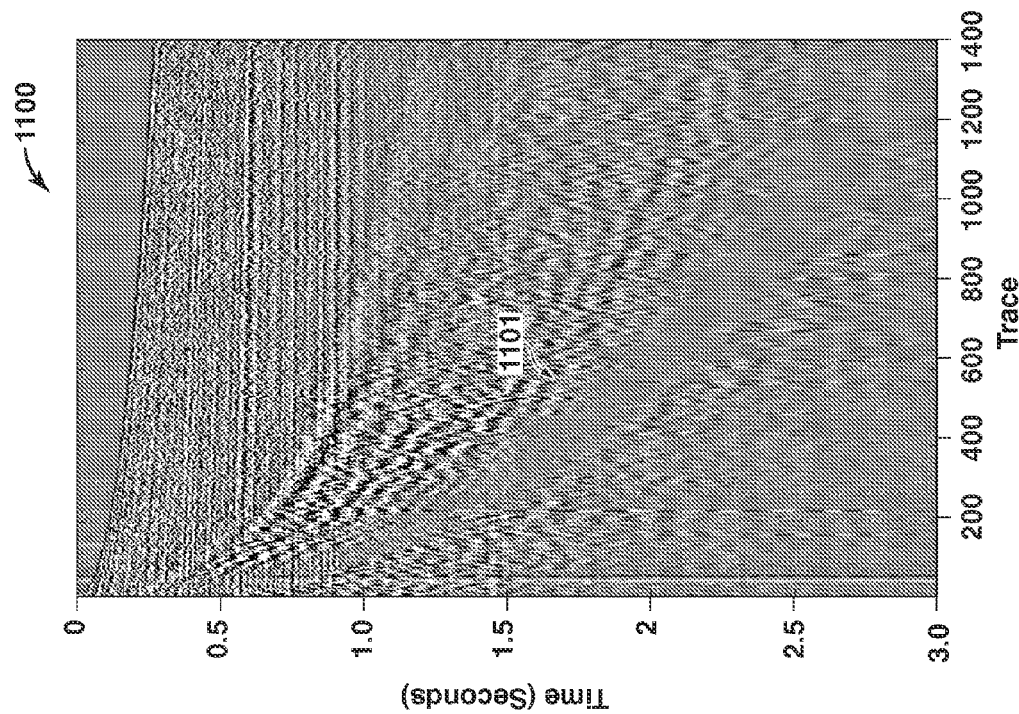
FIG. 11 depicts an example of the output of the process of FIG. 3 with surface waves mitigated, according to embodiments of the invention.

FIG. 11 depicts an example 1100 of the output 320 of block 319. In FIG. 11, surface waves have been removed or minimized in the data at the top of the mitigation window 1101, because surface wave dispersion and spatial variability of the waves has been accounted for in the process. Note that the mitigation window may be kept narrow in order to minimize the effect of the windowing on the body wave data. Since the process reduced or removed the surface waves, widening of the window is not needed. Thus, the tradeoff between surface-wave mitigation and body wave preservation that is present in the prior art is avoided in this process. Note that the vertical axis depicts time and the horizontal axis depicts trace numbers.

Rapid Characterization of Surface Waves

As stated above, in block 302, the process characterizes the spatial variability of the surface waves in the records 301 by cross-correlating dominant surface wave modes. Embodiments enable rapid characterization of surface-wave properties in space without relying on tomographic techniques and by performing only N×1 cross-correlations. Embodiments recognize that this is possible because in exploration seismology, seismic stations are far more uniform and spatial sampling rates are orders of magnitude higher than those in earthquake seismology.

Embodiments note that estimating the local dispersion curves everywhere in the survey is computationally intensive. Thus, if there are sub-regions of the survey where the surface wave velocities are constant or near constant, then the estimate for one location in the sub-region may be applied to every location in the sub-region, and therefore save computation resources. Embodiments are operative to collecting traces that are nearby each other, and along the same azimuth from the shot source, so that the surface is varying only in the radial directions at the distance from the source to the receiver, but not in the direction of travel.

Embodiments note that the traces cannot be directly cross-correlated due to phase distortion inherent in dispersive surface waves. Embodiments are operative to cross-correlate the traces after converting them into complex analytic signals. Embodiments repeat the processing for multiple shots to average the results. Embodiments form a map that depicts the local group velocity estimate for surface waves over the survey area. The resulting map will depict areas that have relatively constant velocities and areas that do not. Note that 'relative' is defined, e.g., less than or equal to 10% variation of group velocity within an area. The spatial scale of variability is useful for the process 300 of FIG. 3, particularly for determining the size of the window that should be used in block 309.

FIG. 12 depicts an example of a process 1200 to characterize the spatial variability of the surface waves by cross-correlating dominant surface wave modes. FIG. 12 is an example of a process for block 302.

The process 1200 begins with common-shot gather seismic data $g(r_i|r_s;t)$, 1201 where $r_s$ is the location of the source and $r_i$ is the location of the i-th receiver. The data 1201 is sorted by block 1202 as a function of source-receiver offset. Note that data 1201 may be a portion of the data of the seismic record 201 or 301. The results of block 1202 is sorted seismic data 1203. Note that the traces are formed by detectors detecting the common shot.

The sorted seismic data 1203 is roughly time-windowed over a specific surface wave mode, preferably over the most energetic mode, by block 1204. The time window is chosen to be sufficiently wide so that spatial variation of surface wave propagation speeds can be captured. The results of block 1204 is time-windowed data 1205.

The time-windowed signals 1205 are Fourier transformed to determine the energetic frequency band of the surface wave mode in block 1206. The transformed signals are then band-pass filtered over that energetic frequency band to increase the signal-to-noise ratio. The output is the time-frequency filtered signal $\tilde{g}(r_i|r_s;t)$ 1207.

Figure 13A:
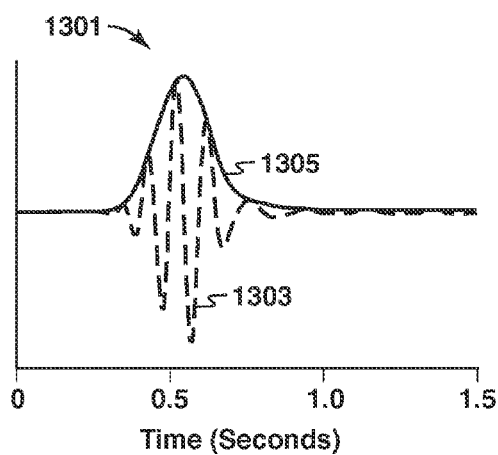
FIGS. 13A and 13B depict examples of results of block 1206 and block 1208 of the process of FIG. 12.
Figure 13B:
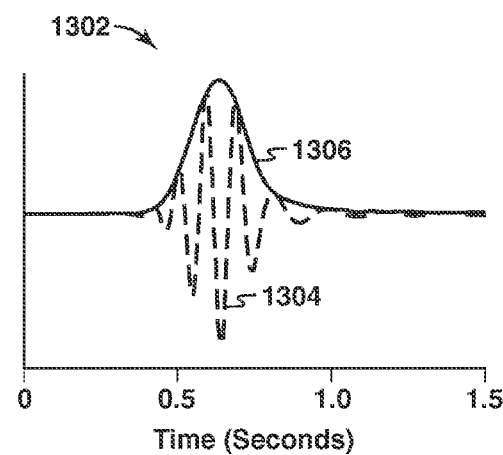

FIGS. 13A and 13B depict two examples 1301, 1302 of signals 1207 resulting from block 1206. The lines 1303, 1304 show two seismic traces, $\tilde{g}(r_1|r_s;t)$ and $\tilde{g}(r_2|r_s;t)$, time-windowed and bandpass filtered over a surface-wave mode. The lines 1303, 1304 are measurements from two seismic stations from a common source and are along the same azimuth or nearly the same azimuth, e.g. 5 degrees or less, from the source. The offset difference between the two stations is 20 m. Note that station of FIG. 13A is closer to the shot source than the station of FIG. 13B, as the trace of FIG. 13A is earlier than the trace of FIG. 13B.

The time-frequency filtered signals $\tilde{g}(r_i|r_s;t)$ 1207 are converted into analytic signals $\tilde{g}_+(r_i|r_s;t)$ by summing $\tilde{g}(r_i|r_s;t)$ and its Hilbert transform in block 1208. The output is the time-frequency filtered analytic signal $\tilde{g}_+(r_i|r_s;t)$ 1209 of a specific surface wave mode at each seismic station. Analytic signals can further be down-sampled to baseband in order to reduce the computational cost of the subsequent process blocks below.

FIGS. 13A and 13B also depict two examples 1305, 1306 of results 1209 from block 1209. The lines 1305, 1306 are the magnitudes of the corresponding analytic signals $\tilde{g}_+(r_1|r_s;t)$ and $\tilde{g}_+(r_2|r_s;t)$ obtained by the Hilbert transformation. Note that if the signals are noisy, the envelopes of the signals, namely lines 1305, 1306 can be used for further processing rather than the signals themselves.

For each seismic station, the analytic signal $\tilde{g}_+(r_i|r_s;t)$ 1209 is cross-correlated in block 1210 with another analytic signal $\tilde{g}_+(r_j|r_s;t)$ from an adjacent seismic station that is selected to be along the same source-receiver azimuth to obtain the relative travel time delay $\tau_{+,ij}=\arg\max_\tau |R_{+,ij}(\tau)|$ of the surface waves between the stations, where $R_{+,ij}(\tau)=\tilde{g}_+(r_i|r_s;\tau)\hat{x}\tilde{g}_+(r_j|r_s;\tau)/\sqrt{E_{+,i}E_{+,j}}$, $E_{+,i}=\int |\tilde{g}_+(r_i|r_s;t)|^2 dt$, and $\hat{x}$ is the cross-correlation operator. The offset difference between the stations is divided by the relative travel time delay. This is the estimate of the surface-wave group velocity at the location of the seismic station. This block 1210 is performed over all seismic stations to obtain the local group velocity estimates over the entire survey area 1211. Note that this block may cross-correlate the envelope signals $|\tilde{g}_+(r_i|r_s;t)|$ instead of analytic signals to obtain the time delay, if the traces suffer relatively low signal-to-noise ratio.

Figure 14:
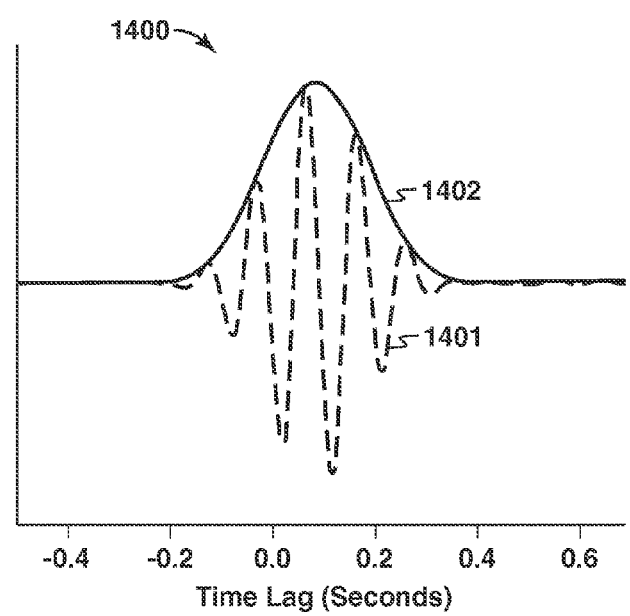
FIG. 14 depicts the operation of block 1210 of FIG. 12 on the data of FIGS. 13A and 13B.

FIG. 14 depicts the operation of block 1210 on the data of FIGS. 13A and 13B. Line 1401 is the cross-correlation function of the real signal, $R_{12}(\tau)=\tilde{g}(r_1|r_s;\tau)\hat{x}\tilde{g}(r_2|r_s;\tau)/\sqrt{E_1 E_2}$ where $E_i=\int |\tilde{g}(r_i|r_s;t)|^2 dt$, and line 1402 is $|R_{+,12}(\tau)|$. From the properties of the Hilbert transform, e.g. see S. Haykin, "Communication systems," $2^{nd}$ Ed., Wiley, 1984, which is hereby incorporated herein by reference, $R_{+,ij}(\tau)=R_{ij}(\tau)+H\{R_{ij}(\tau)\}$, where $H\{\bullet\}$ is the Hilbert transform operator. Thus, from FIG. 14, $\tau_{+,12}=\arg\max_\tau |R_{+,12}(\tau)|$ occurs at 90 ms. The local group velocity can then be determined between the two stations to be 222 m/s. However, if the conversion of the seismic traces to analytic signals does not occur, then the cross-correlation peak $\tau_{12}=\arg\max_\tau |R_{12}(\tau)|$ occurs at 70 ms, which results in an erroneous 286 m/s for the local group velocity. Note that the peak of FIG. 14 is the estimate being used for the group delay.

In block 1212, erroneous group velocity estimates are removed by neglecting group velocity estimates that are beyond the upper and the lower thresholds. These thresholds may be defined as the values that are one standard deviation from the mean group velocity at each spatial location. Note that the group velocity estimates whose correlation coefficients are too low may also be neglected, since they do not have sufficient coherence of surface waves between the stations. The output is the regularized local group velocity estimates 1213 over the survey area.

Figure 15:
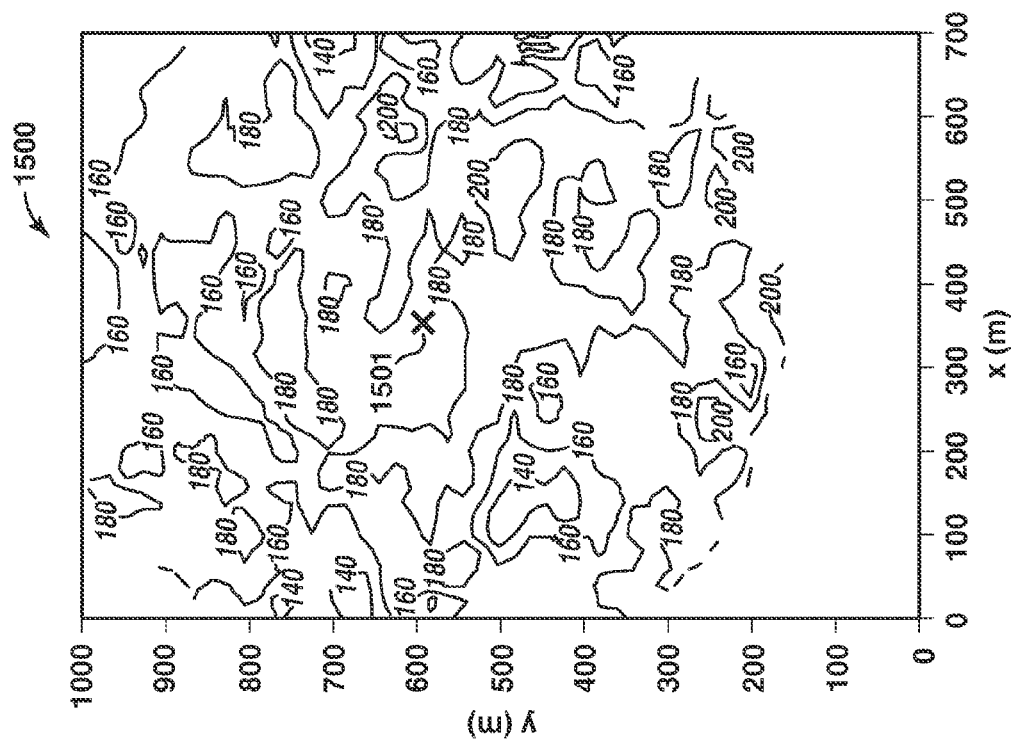
FIG. 15 depicts a map of the local group velocities for surface waves estimated using one common-shot gather, according to embodiments of the invention.

FIG. 15 depicts a map 1500 of the local group velocities for surface waves estimated using one common-shot gather. The shot or source location 1501 is marked with an x. Map 1500 is an example of the result 1213 of block 1212. FIGS. 13 and 14 depicts the results for one pair of traces, while FIG. 15 depicts all of the pairs of traces, e.g. each adjacent source-receiver pair for the one shot.

The above blocks are repeated over different shots to obtain many estimates of the group velocities at each station. In block 1214, estimates of the group velocities for each station are then averaged to obtain robust estimates of the group velocities as a function of space. The output is the averaged local group velocity estimates 1215 over the entire survey area.

Figure 16:
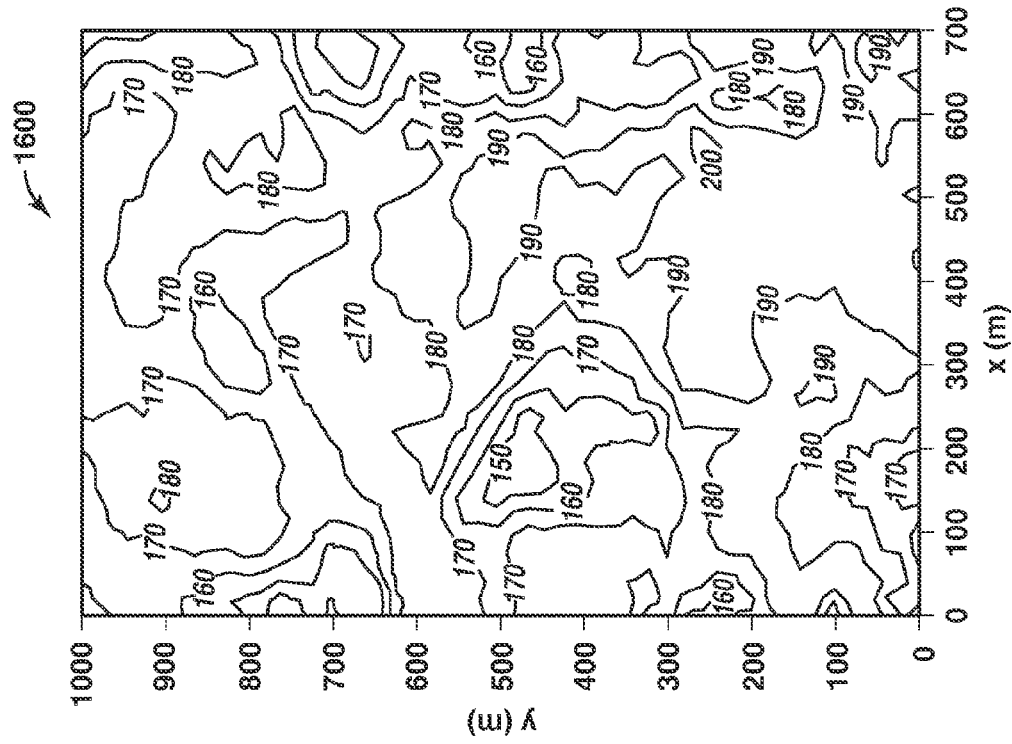
FIG. 16 depicts a map of the local group velocities estimates obtained after averaging the estimates over many shots, according to embodiments of the invention.

FIG. 16 depicts a map 1600 of the local group velocity estimates obtained after averaging the estimates over many shots. Map 1600 is an example of the result 1215 of block 1214. Map 1600 depicts the entire survey area. Note that the averaging reduces variance of the estimates.

Note that the process 1200 above can also be applied to common-receiver gathers by changing the role of the source and receiver using the seismic reciprocity theorem. In addition, the method can be repeated for any and all surface-wave modes of interest, if desired or required.

The resulting average group velocity map can be used for many purposes. The map can be used to determine whether strong spatial variability of surface wave properties exists in the survey area. This is beneficial to the surface wave mitigation process 300 depicted in FIG. 3. Other applications exist that can use maps of surface wave velocities obtained rapidly and with little computational or human effort. For example, these maps, being a characterization of the average surface-wave velocity over the surface-wave frequency spectrum, are correlative with other characteristics of the survey area, such as shear wave statics, vegetation types, soil characteristics, moisture content, seismic source and sensor coupling, etc. Thus, these maps could therefore be used as inputs to interpretive and design work flows for operations that use surface waves, in addition to those that do surface wave mitigation. For example, the maps could also be used to obtain rough estimates of the near-surface shear properties over the survey area. Such estimates could be of benefit in seismic survey design, environmental characterization, processing of seismic data to mitigate the effects of the overburden by a) static corrections or b) seismic imaging with micro-features built into the velocity model, compressional-to-shear (P-S) wave imaging and registration, etc. One could also generate a few different average group velocity maps by averaging the group velocity estimates over different azimuthal bins. These azimuthal average velocity maps could be used to investigate azimuthal anisotropy.

For example, data describing surface waves is also useful for shear wave analysis. The surface waves probe the upper portions of the ground, for example to a depth of about 200 m. Thus, the surface wave can be used to describe the shear wave velocity, and can be used to determine the shear strength of the ground. This is important for construction of road, bridges, building, oilfield facilities, etc. In seismic processing, seismic statics are important because the local shear wave velocities near the surface affect the upward propagating data, as well as delay waves slightly differently in different locations. Shear wave properties may also be useful in detecting or finding veins of materials that have these different shear wave properties than the surrounding ground.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 17:
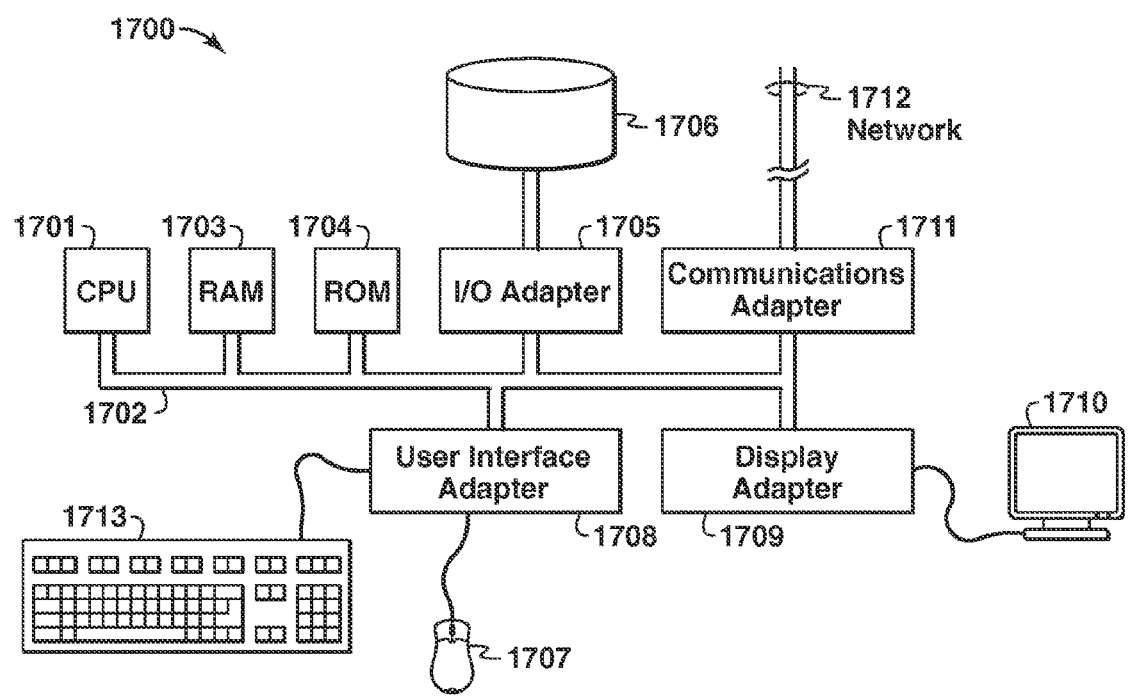
FIG. 17 depicts a block diagram of a computer system which is adapted to use the present invention.

FIG. 17 illustrates computer system 1700 adapted to use the present invention. Central processing unit (CPU) 1701 is coupled to system bus 1702. The CPU 1701 may be any general purpose CPU, such as an HP PA-8500 or Intel Pentium processor or a cluster of many such CPUs as exemplified by modern high-performance computers. However, the present invention is not restricted by the architecture of CPU 1701 as long as CPU 1701 supports the inventive operations as described herein. Bus 1702 is coupled to random access memory (RAM) 1703, which may be SRAM, DRAM, or SDRAM. ROM 1704 is also coupled to bus 1702, which may be PROM, EPROM, or EEPROM. RAM 1703 and ROM 1704 hold user and system data and programs as is well known in the art.

Bus 1702 is also coupled to input/output (I/O) controller card 1705, communications adapter card 1711, user interface card 1708, and display card 1709. The I/O adapter card 1705 connects to storage devices 1706, such as one or more of a hard drive, a CD drive, a floppy disk drive, a tape drive, to the computer system. The I/O adapter 1705 is also connected to printer 1714, which would allow the system to print paper copies of information such as document, photographs, articles, etc. Note that the printer may be a printer (e.g. inkjet, laser, etc.), a fax machine, or a copier machine. Communications card 1711 is adapted to couple the computer system 1700 to a network 1712, which may be one or more of a telephone network, a local (LAN) and/or a wide-area (WAN) network, an Ethernet network, and/or the Internet network. User interface card 1708 couples user input devices, such as keyboard 1713 and pointing device 1707 to the computer system 1700. The display card 1709 is driven by CPU 1701 to control the display on display device 1710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of processing exploration seismic survey data from a region, wherein the seismic survey data comprises body waves and surface waves, and the region comprises a plurality of locations, the method comprising:
   receiving seismic survey data from at least one sensor;
   characterizing spatial variability of a surface wave property for each location in the region, wherein the property is surface wave velocity or an attribute of velocity;
   designing filtering criteria to separate at least a portion of the surface waves from the body waves in the seismic survey data using the characterization; and
   applying the criteria to the seismic data to remove, using a computer, at least a portion of the surface waves from the seismic survey data.

2. The method of claim 1, wherein the designing does not use interpolation to form a surface wave property for locations in the region.

3. The method of claim 1, wherein the property is velocity dispersion of the surface waves.

4. The method of claim 1, wherein characterizing comprises:
   estimating a local group velocity of the surface waves using cross-correlation.

5. The method of claim 1, wherein characterizing comprises:
   converting the seismic survey data into complex analytic signals;
   estimating a local group velocity of the surface waves by cross-correlation of the analytic signals; and
   averaging the local group velocity estimates.

6. The method of claim 1, further comprising:
   organizing the seismic survey data into gathers of traces;
   wherein the gather is at least one of a common-shot type shot, a common-receiver type shot, and a super-shot type shot.

7. The method of claim 1, further comprising:
   using the seismic survey data having the portion of surface waves removed to determine whether there is an underground deposit of hydrocarbons in the region.

8. The method of claim 3, further comprising:
  determining whether the region can be subdivided into a plurality of sub-regions based on the characterization, wherein the spatial variability is relatively constant within each sub-region;
  if the determining is affirmative, estimating at least one local dispersion curve for each sub-region, and using that estimate for each location in the sub-region;
  if the determining is negative, forming at least one dispersion curve for each location in the region;
  using the dispersion curves from one of the estimating and the forming, extrapolating the dispersion curves over a frequency band; and
  using the extrapolated dispersion curves to design the filtering criteria.

9. The method of claim 8, wherein the characterizing comprises forming a surface-wave group velocity map of the region; and the forming at least one dispersion curve comprises:
  autocorrelating the group velocity map to determine correlation lengths of the surface waves;
  determining a size of a window;
  moving the window about the map;
  estimating a local dispersion curve of the surface wave in each window; and
  averaging repeating local dispersion curves at each location.

10. The method of claim 9, wherein determining a size of a window comprises:
  using the correlation lengths as the size of the window.

11. The method of claim 9, wherein moving the window about the map comprises:
  moving the window about the map wherein each window overlaps with a previous window.

12. The method of claim 8, wherein characterizing comprises:
  converting the seismic survey data into complex analytic signals;
  estimating a local group velocity of the surface waves by cross-correlation of the analytic signals; and
  averaging the local group velocity estimates.

13. The method of claim 12, wherein the seismic survey data comprises a plurality of traces from a plurality of receivers of a shot source, and wherein characterizing further comprises:
  sorting the data by source receiver offset.

14. The method of claim 12, wherein the seismic survey data comprises a plurality of traces from a plurality of receivers of a shot source, and wherein estimating comprises:
  selecting the seismic survey data from two receivers for cross-correlation, wherein the two receivers have substantially the same azimuth to the source.

15. The method of claim 12, further comprising:
  prior to the averaging, ignoring a noisy local group velocity.

16. The method of claim 8, wherein the cross-correlations are N×1 type.

17. The method of claim 12, wherein the characterizing forms at least one surface-wave group velocity map of the region that depicts subregions of relatively constant group velocities.

18. The method of claim 8, further comprising:
  organizing the seismic survey data into gathers of traces;
  wherein the gather is at least one of a common-shot type, a common-receiver type, and a super-shot type.

19. The method of claim 8, further comprising: using the seismic survey data having the portion of the surface wave removed to determine whether there is an underground deposit of hydrocarbon in the region.

20. The method of claim 8, wherein all determinings are negative, and wherein the seismic survey involved a source and at least one receiver, and further comprising:
  integrating the extrapolated dispersion curves along a path from the source to a corresponding receiver, and forming a filter using the path-integration curves.

21. A method of processing seismic data from a region, wherein the seismic data comprises a plurality of traces from a plurality of receivers of a shot source, and the region comprises a plurality of locations, the method comprising:
  converting the traces into complex analytic signals, using a computer;
  characterizing a spatial variability of velocities of surface waves for each location in the region by cross-correlating the analytic signals of neighboring traces; and
  averaging the local group velocity estimates to determine the spatial variability of the surface waves.

22. The method of claim 21, wherein characterizing comprises:
  determining an offset difference for the neighboring traces; and
  dividing the offset difference by a time of a cross-correlation peak.

23. The method of claim 21, wherein the spatial variability is used to mitigate the surface waves in the seismic data.

24. The method of claim 21, where the spatial variability is used for analysis of at least one of shear wave statics, vegetation types, soil characteristics, moisture content, and seismic source and receiver coupling.

25. The method of claim 21, wherein the spatial variability is expressed as a map, and the map is used for at least one of seismic survey design, environmental characterization, processing of seismic data to mitigate effects of overburden by static corrections or seismic imaging, compressional-to-shear (P-S) wave imaging and registration, and determination of and processing for azimuthal anisotropy of shear-wave velocities.

* * * * *